United States Patent
Brief et al.

(10) Patent No.: US 10,387,226 B2
(45) Date of Patent: Aug. 20, 2019

(54) TIMESTAMP SUPPRESSION

(71) Applicant: Western Digital Technologies, Inc., San Jose, CA (US)

(72) Inventors: David Brief, Modiin (IL); Arseniy Aharonov, Rehovot (IL); Amir Rozen, Rishon Lezion (IL); Asaf Gueta, Or-Yehuda (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/811,123

(22) Filed: Nov. 13, 2017

(65) Prior Publication Data
US 2019/0146856 A1    May 16, 2019

(51) Int. Cl.
*G06F 9/54* (2006.01)
*G06F 9/48* (2006.01)
*G06F 9/38* (2018.01)
*G06F 11/36* (2006.01)

(52) U.S. Cl.
CPC ............ *G06F 9/542* (2013.01); *G06F 9/3861* (2013.01); *G06F 9/3871* (2013.01); *G06F 9/4887* (2013.01); *G06F 11/36* (2013.01)

(58) Field of Classification Search
CPC ....................................................... G06F 9/542
USPC ....................................................... 719/318
See application file for complete search history.

(56) References Cited

U.S. PATENT DOCUMENTS

| | | | |
|---|---|---|---|
| 7,251,748 B2* | 7/2007 | Liberty | G06F 11/0769 707/999.201 |
| 7,929,523 B2 | 4/2011 | Shenfield et al. | |
| 9,400,734 B2 | 7/2016 | Aharonov et al. | |
| 2005/0021708 A1 | 1/2005 | Raghuraman et al. | |
| 2010/0107143 A1 | 4/2010 | Emberling | |
| 2015/0082325 A1 | 3/2015 | Aharonov et al. | |
| 2018/0224887 A1* | 8/2018 | Pitigoi-Aron | G06F 13/24 |

OTHER PUBLICATIONS

U.S. Appl. No. 16/012,236, filed Jun. 19, 2018, Zaidman et al.
Stack Overflow; "Android—How to sync Kernel time and logcat time?"; downloaded from the Internet on Apr. 4, 2018 at https://stackoverflow.com/questions/6329648/how-to-sync-kernel-time-and-logcat.time; 3 pages.

(Continued)

*Primary Examiner* — Andy Ho
(74) *Attorney, Agent, or Firm* — Brinks Gilson & Lione

(57) ABSTRACT

A system on a chip or storage device has a dynamic process for handling system events that are transmitted at varying transmission rates. This dynamic process is a hybrid mode of operation that tailors the use of time stamp information according to the dynamic flow of events that are submitted in the system. Relative time stamps can be used along with explicit time stamps. Periodic wrap around events which use relative time stamps based on the periodic wrap events may be suppressed when there were no events between consecutive wrap around events. When an asynchronous event occurs during the suppression, the event is identified with a high precision time stamp (HPTS) rather than a relative time stamp. The periodic wrap around events can be re-initiated after the HPTS event is stamped.

20 Claims, 9 Drawing Sheets

(56) References Cited

OTHER PUBLICATIONS

Stack Exchange; "Logging—How can I view and examine the Android log?"; downloaded from the Internet on Apr. 4, 2018 at https://android.stackexchange.com/questions/14430/how-i-view-and-examine-the-android-log; 5 pages.
Stack Overflow; "Is Android using NTP to sync time?"; downloaded from the Internet on Apr. 4, 2018 at https://stackoverflow.com/questions/14381005/is-android-using-ntp-to-sync-time; 3 pages.
Stack Overflow; "Android—Taking logcat and kernel logs simultaneously"; downloaded from the Internet on Apr. 4, 2018 at https://stackoverflow.com/questions/22652605/taking-logcat-and-kernal-logs-simultaneously; 1 page.
U.S. Appl. No. 15/820,147, filed Nov. 21, 2017, entitled, "System and Method for Time Stamp Synchronization", 31 pages.

* cited by examiner

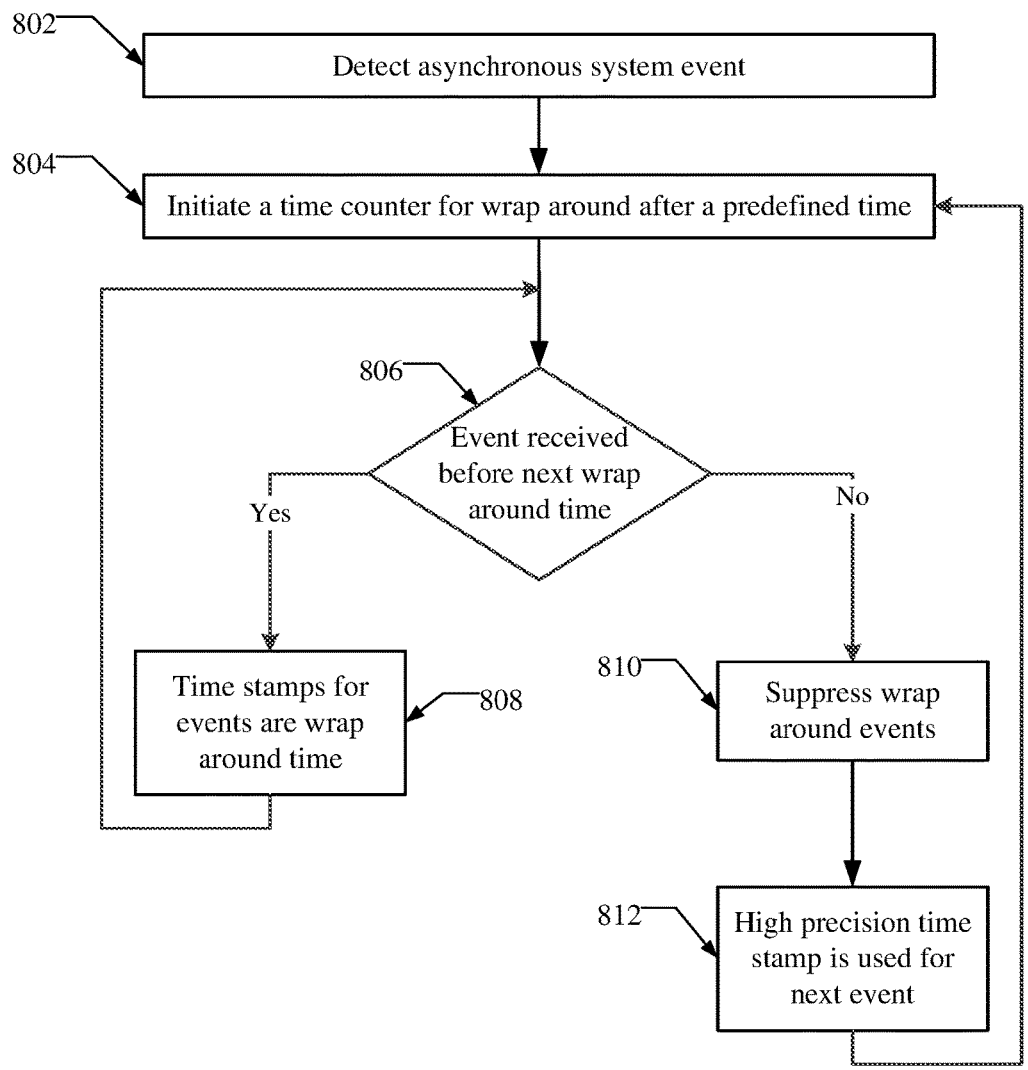

TIMESTAMP SUPPRESSION

TECHNICAL FIELD

This application relates generally to event tracking in computing devices such as a memory device. More specifically, this application relates to providing debugging/testing with dynamic handling and tracking of system events.

BACKGROUND

A system on a chip (SOC) system, such as flash memory, have been widely adopted for use in consumer products. These SOCs may be found in different forms, for example in the form of a portable memory card that can be carried between host devices or as a solid state disk (SSD) embedded in a host device. Debugging, integrating, and testing such devices presents unique challenges because of the complexity of the device architecture and speed of operation. To determine the root cause of device failures during development and deployment of such devices requires the creation of sophisticated high speed debugging tools and methods. Debugging and system testing for system on chip ("SoC") devices may be more complicated due to complex hardware and software interactions. Every event from the system should have a time stamp associated with it that can be used for debugging or testing. The time stamp should be accurate, but could take up excessive and unnecessary bandwidth if the time stamp is too long. Shorter time stamps that are issued more frequently may need increased storage to track them.

SUMMARY

In order to address the need for improved debugging and testing in a sophisticated device having hardware and software components, methods and apparatus are disclosed herein for generating and transmitting time stamped event codes generated during the run-time operation of the device. The embodiments describe a memory system or storage device that may be on a system on a chip (SoC) environment has a dynamic process for handling system events that are transmitted at varying transmission rates. This dynamic process may be a hybrid mode of operation that tailors the use of time stamp information according to the dynamic flow of events that are submitted in the system. Specifically, relative time stamps (for wrap around events a/k/a synchronous events) can be used along with explicit time stamps (high precision time stamps), according to the varying flow of the events that are submitted in the system and also based upon system requirements. For example, periodic wrap around events in random access memory (RAM) may be suppressed after there were no events between two consecutive wrap around events. Accordingly, when an asynchronous event occurs, the event may be stamped with a high precision time stamp (HPTS) and the wrap around events can then be initiated again.

BRIEF DESCRIPTION OF THE DRAWINGS

FIG. 8 is a flow diagram of dynamically tracking events by suppressing wrap around events.

DESCRIPTION OF THE EMBODIMENTS

Figure 1A:
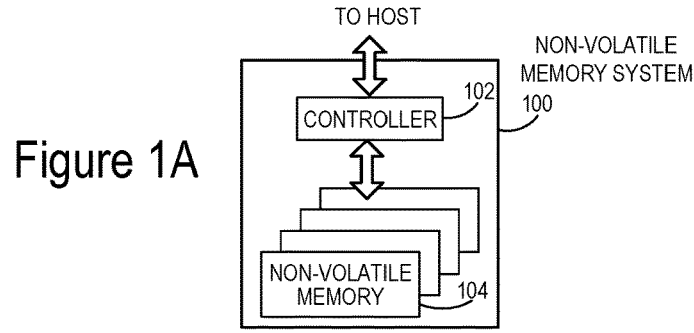
FIG. 1A is a block diagram of an example non-volatile memory system.

In various computing environments including a storage device or memory system, debugging or diagnostics may be necessary for identifying and fixing past or future errors. Event codes can be used for the identifying and fixing of errors. Event codes may be generated in response to receiving periodic or service events and asynchronous events from one or more hardware and software sources in a device, for example. A device may consist of any embedded system like a printer, a scanner, a cell phone, a digital camera etc. Hardware and/or software in the device may be configured to generate periodic events at regular intervals and with equal inter-event time spacing. Asynchronous events may be generated by hardware and software in response to the occurrence of a condition in the hardware or simply as an indication that a particular software instruction has or is being executed. The occurrence of asynchronous events cannot be generally predicted deterministically. The event codes may include a unique indication corresponding to a received event and additional information including an indication when the received event was generated. The event codes may be transmitted after they are generated.

The embodiments include a dynamic decision making scheme for using relative time stamps (wrap around or synchronous events) in addition to explicit time stamps (high precision time stamps). Wrap around time stamps that occur periodically may be unnecessary when there are no events to be time stamped, whereas high precision time stamps for every event take up more space. Accordingly, a dynamic or hybrid system that combines both types of time stamps may be beneficial.

The periodic wrap around events may be interleaved with high precision time stamps and both are sent only when required. An asynchronous event may be an event from the system under test and can happen at any time. Wrap around events may be referred to as synchronous events and are used for identifying a time stamp for asynchronous events that occur between consecutive wrap around or synchronous events in the system. When no events are detected in the system between consecutive wrap around events, subsequent wrap around events are suppressed and a high precision time stamp is sent with the next asynchronous system event.

The relative time stamps for wrap around events are sent after a regular event is submitted in the system. Since the normal events in the system are typically transmitted at a non-constant rate, the time stamp information attached to or encoded with the submitted event code may not provide sufficient information for profiling or tracking purposes.

Wrap around events that are produced at a constant rate can emulate normal events, which may be also referred to as service events. Accordingly, such wrap around events are transmitted at a configurable rate according to system requirements, in a way that provides profiling of system events (i.e. normal events) that are submitted in the system.

The embodiments described below are applicable in any profiling/event-tracking system environment that requires using time stamp information with the submitted events, for example for monitoring and scheduling the timing of the analyzed events that are submitted in the system. The environment may include a computing system (host and storage device, which may be collectively referred to as a memory system) that includes profiling/event-tracking systems for analyzing events that are submitted with time stamps on the system. The events may be from multiple sources and subject to a performance impact. The events may be submitted at different rates. For example, events may be limited to 32 bits width rather than the 48 bits width of the high precision time stamp register. In one embodiment, high precision time stamps could be sent with all events that add a special event-code (Special_Event_UID) that can be transmitted as a supplement event-code immediately after each regular event-code (Event_UID). In a system where the events are submitted at a very high rate adding a time stamp to each captured event may introduce overhead. Alternatively, rather than sending high precision time stamps and relying on relative time stamps (e.g. in the form of wrap around events) that are sent all the time even when there are no asynchronous events between them when the clock register wraps around. In other words, wrap around events are sent for time synchronization marking even if no events are detected in the system in the time frame between wrap around events. In time periods where there are no events in the system this may result in many consecutive wrap around events that need to be logged and processed.

As described, event codes generated in response to periodic events are referred to as periodic event codes and event codes generated in response to asynchronous events are referred to as asynchronous event codes. Examples of hardware generated events include a hardware interrupt being triggered by the reception of data via a communication port, completion of a write operation to a flash device etc. Software events may be configured for example to be generated when a particular variable in software is written or read from etc. Examples of configuring software events include the setting of memory access triggers. Hardware generated events and software events are examples of asynchronous events.

An event code as disclosed may include an identifier of the event, the source of the event and a time stamp indicating a time when the event occurred. Conventionally, a time stamp associated with an event generally corresponds to the time when an event occurs from an arbitrary initial point in time. The arbitrary initial point may correspond to when the device is powered on. Separately, in some instances a generated event code may include information corresponding to the operational status of the source of the event. In some scenarios, a generated periodic event code may not include a time stamp. Instead, in this scenario the identifier of the periodic event in the event code may be used to implicitly determine when the periodic event occurs with reference to the arbitrary initial point of time, since device power-up for example. In some other scenarios, generated asynchronous event codes may include a time stamp fraction or offset from a previously received periodic event instead of an explicit time stamp. An advantage of utilizing a time stamp fraction instead of an explicit time stamp as a reference to when the asynchronous event was generated is that the event code will occupy lesser data space when stored because the time stamp fraction corresponds only to a portion of the time stamp. In some instances, the apparatus may store the event codes for future analysis or transmission.

The generated event codes may be utilized to trace the operation of the hardware and execution of the software that generated the corresponding events. Tracking the operation of systems by utilizing event codes is frequently referred to as event tracking. Apparatuses and methods are also disclosed that receive and analyze the generated event codes and may generate a chronological depiction of the occurrence of the events to trace the operation of the hardware and the execution of the software based on the information in the received event codes. As an example, an event tracing unit receiving event codes may count or keep track of the number of periodic event codes received. By multiplying the number of event codes by the pre-configured or pre-determined inter-periodic event time, the system may calculate the exact or close to exact time when the last periodic event received was generated. On receiving an asynchronous event code, the event tracing unit may retrieve the time offset and add the time offset to the number corresponding to the product of the number of the last received periodic event code and the inter-periodic event time to determine when the asynchronous event that caused the generation of the asynchronous event code was generated by the hardware or software. For example, if an asynchronous event code is received after N periodic event codes and if the time stamp fraction or offset in the asynchronous event code is X milliseconds since the last periodic event and if the inter-periodic event time is Y milliseconds, the event tracing unit may determine that the asynchronous event was generated after X+(N×Y) milliseconds since device power up.

FIG. 1A is a block diagram illustrating an exemplary system on a chip (SOC). One example of a SOC is a non-volatile memory system 100. The non-volatile memory system 100 may be a device that is subject to the event tracking described herein. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104. The non-volatile memory die 104 may store an operating system for the host.

Examples of host systems include, but are not limited to, personal computers (PCs), such as desktop or laptop and other portable computers, tablets, mobile devices, cellular telephones, smartphones, personal digital assistants (PDAs), gaming devices, digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol, eMMC, UFS or PCIe/NVMe.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host, such as in the form of a solid state disk (SSD) drive installed in a personal computer.

Although in the example illustrated in FIG. 1A, non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
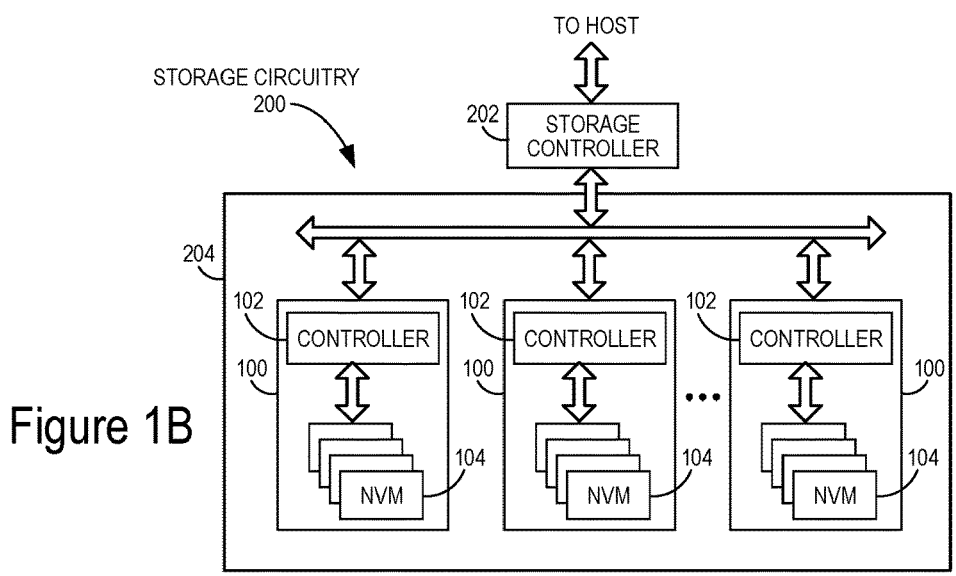
FIG. 1B is a block diagram of a storage module that includes a plurality of non-volatile memory systems.

FIG. 1B illustrates storage circuitry 200 that includes plural non-volatile memory systems 100 and may also be referred to as a storage module 200. As such, storage circuitry 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage circuitry 200, in one embodiment, may be a solid state drive (SSD), such as found in portable computing devices, such as laptop computers, and tablet computers.

Figure 1C:
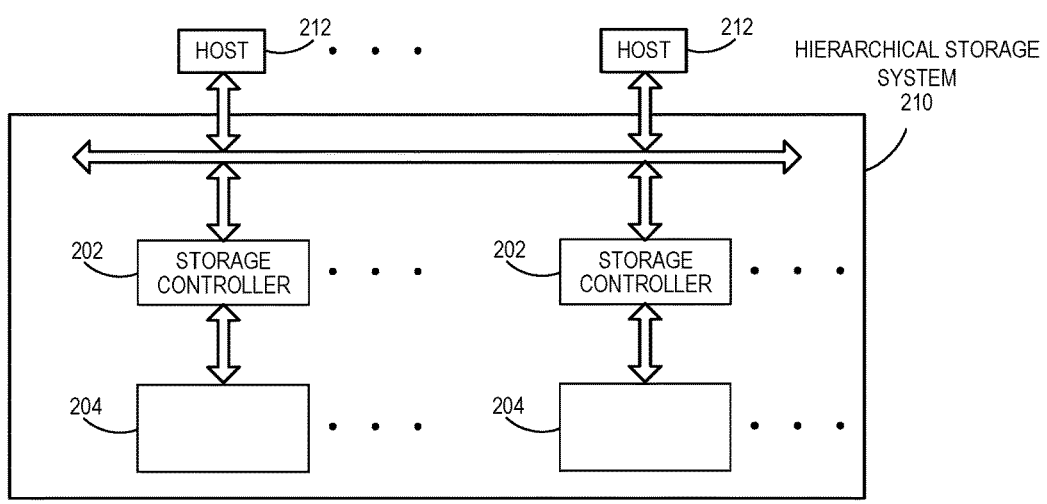
FIG. 1C is a block diagram of a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
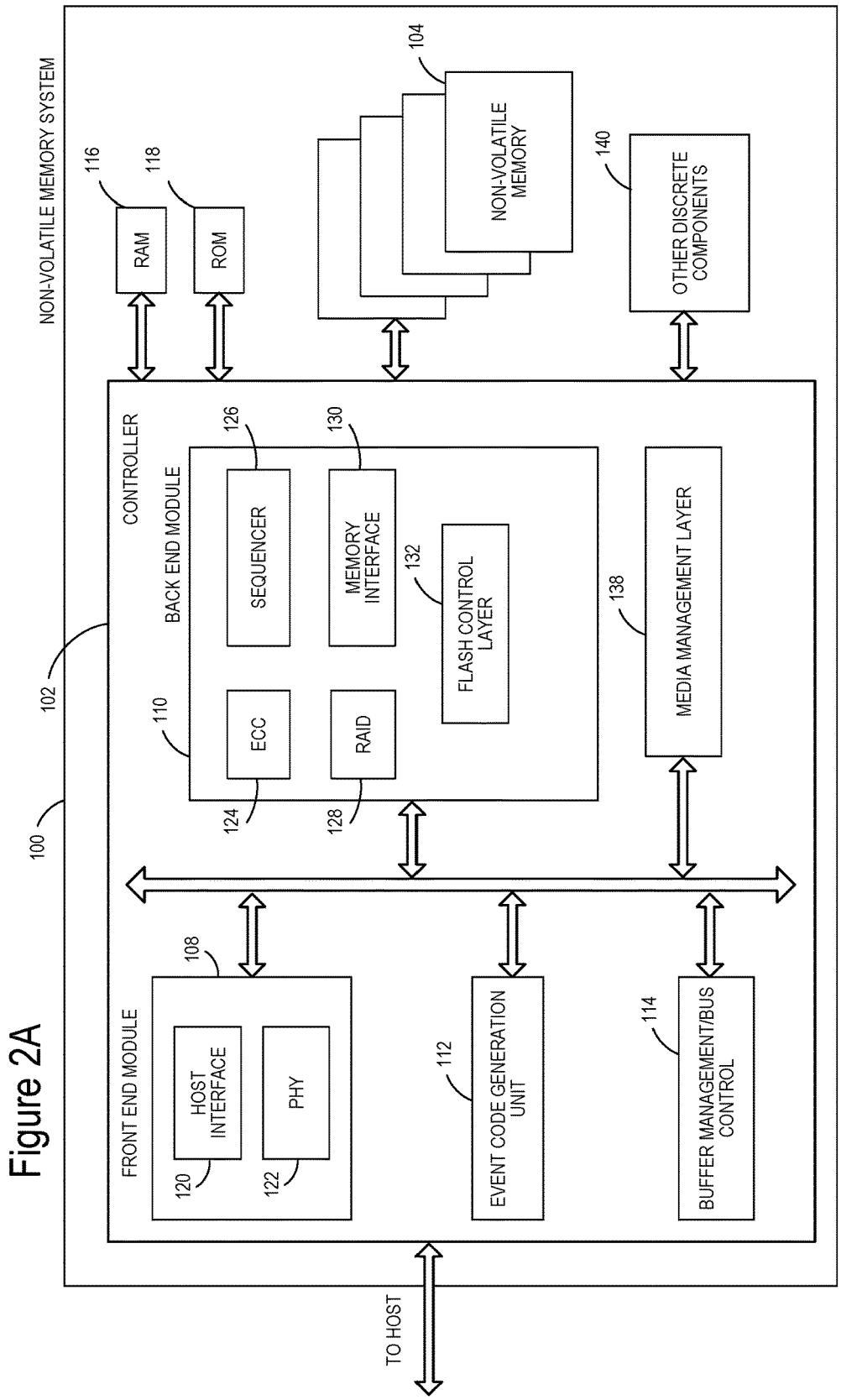
FIG. 2A is a block diagram of exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of circuitry or a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 104, for example, that comprises instructions executable with a processor to implement one or more of the features of the module. When any one of the modules includes the portion of the memory that comprises instructions executable with the processor, the module may or may not include the processor. In some examples, each module may just be the portion of the memory 104 or other physical memory that comprises instructions executable with the processor to implement the features of the corresponding module.

Exemplary modules or circuitry of the controller 102 may include an event code generation unit 112, which is further described with respect to FIGS. 3-6. As explained in more detail below for FIGS. 7-8, the event code generation unit 112 may dynamically handle system events through a hybrid operation mode that uses both relative time stamps and explicit time stamps.

Referring again to modules or circuitry of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die. In one embodiment, the ROM 118 may include firmware that provides the location for the hidden diagnostic partition for the diagnostic mode determiner 112.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

The FTL or MML 138 may be integrated as part of the flash management that may handle flash errors and interfacing with the host. In particular, MML may be a module in flash management and may be responsible for the internals of NAND management. In particular, the MML 138 may include an algorithm in the memory device firmware which translates writes from the host into writes to the flash memory 104. The MML 138 may be needed because: 1) the flash memory may have limited endurance; 2) the flash memory 104 may only be written in multiples of pages; and/or 3) the flash memory 104 may not be written unless it is erased as a block. The MML 138 understands these potential limitations of the flash memory 104 which may not be visible to the host. Accordingly, the MML 138 attempts to translate the writes from host into writes into the flash memory 104. As described below, erratic bits may be identified and recorded using the MML 138. This recording of erratic bits can be used for evaluating the health of blocks.

Figure 2B:
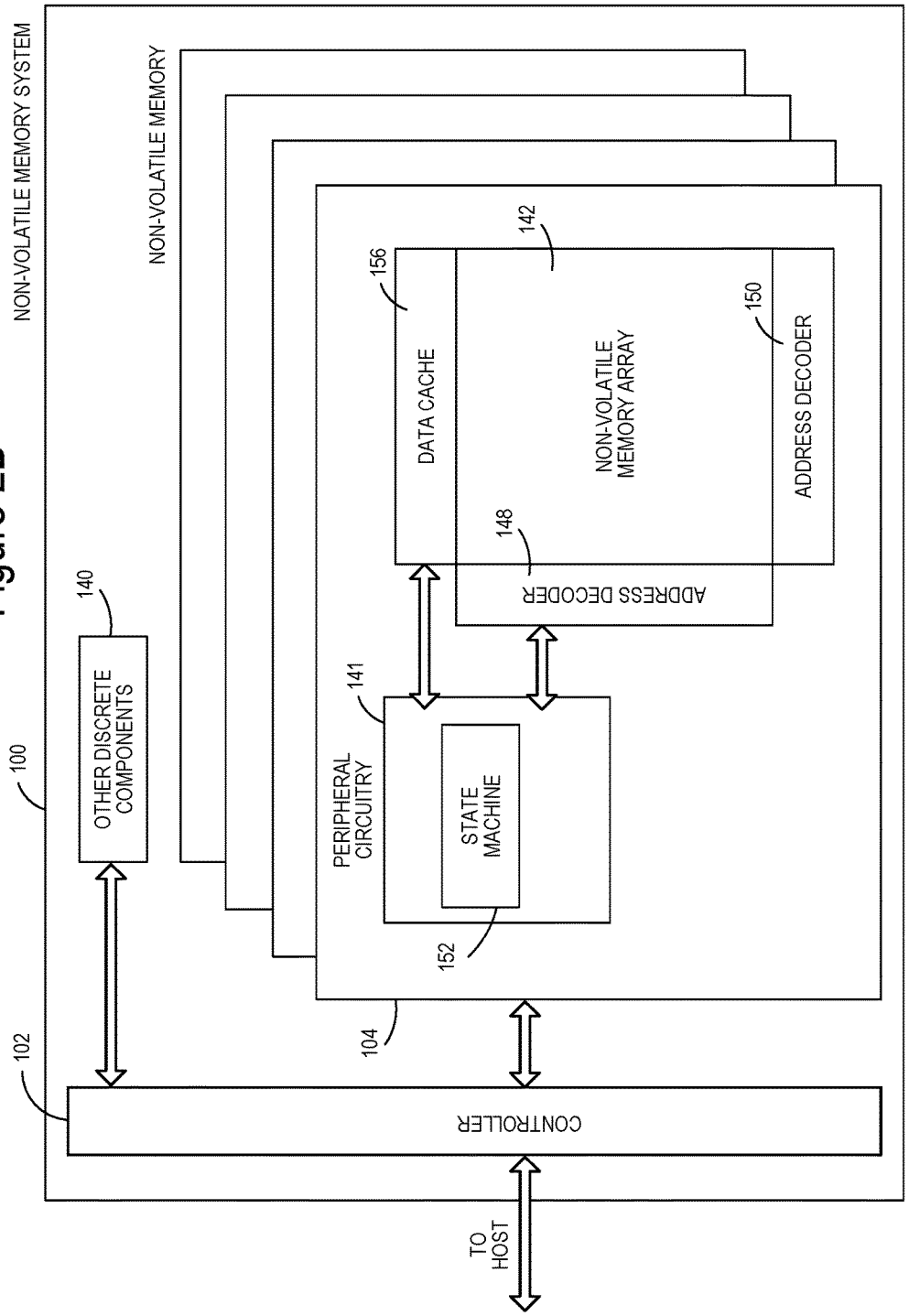
FIG. 2B is a block diagram of exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

Figure 3:
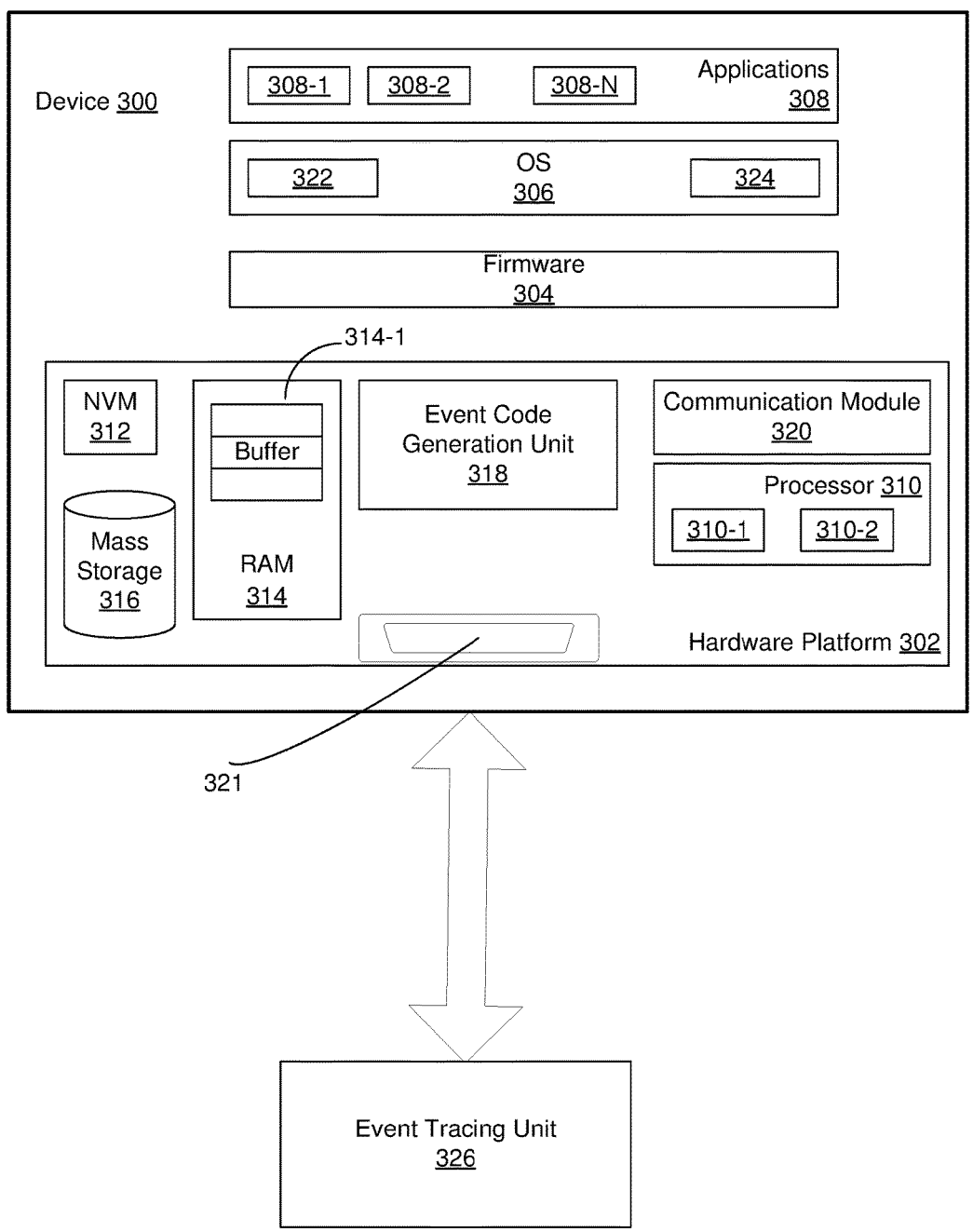
FIG. 3 is a block diagram of an exemplary device for event code generation.

FIG. 3 is a block diagram of example device 300 coupled to event tracing unit 326. In one embodiment, device 300 may be any of the systems shown in FIGS. 1-2B or an alternative embodiment of that memory system. Device 300 includes an apparatus and implements methods that generate event codes in response to receiving periodic and asynchronous events from various elements and subsections of device 300. By way of example and without limitation, device 300 comprises hardware platform 302, firmware 304, operating system 306 and applications 308. In this example, hardware platform 302 comprises processor 310, non-volatile memory (NVM) 312, random access memory (RAM) 314, mass storage memory 316, event code generation unit 318, communication modules 320 and test ports 321. The NVM 312 may be the memory shown in FIGS. 1-2B. Communication module 320 may include one or more standard communication ports including but not limited to communication ports configured to operate according to RS-232, RS-482, IEEE 802.3, IEEE 802.11 etc.

Firmware 304 generally comprises software instructions that when executed by processor 310 configure and control elements of hardware platform 302. Firmware 304 may be stored in NVM 312 and copied to and executed by processor 310 from RAM 314. Applications 308 and operating system 306 may be stored in storage memory 316 and copied to and executed by processor 310 from RAM 314.

Operating system 306 includes software components like scheduler 322 and kernel 324. Examples of operating systems include LINUX, UCOS, WINDOWS, VXWORKS, PSOS etc. Kernel 324 includes software functionality that provides software services and software objects to applications 308. By way of example and without limitation, software objects include threads, queues, and/or semaphores. Applications 308 may invoke functionality in kernel 324 to create these software objects. Applications 308 include applications 308-1 . . . 308-N. Each application 308-1 . . . 308-N may be configured to operate within the context of a corresponding thread. Scheduler 322 determines which thread and consequently which one of applications 308-1 . . . 308-N will be executed by processor 310. Threads may be assigned different priority when they are created. Scheduler 322 generally causes processors 310 to first execute a thread with a higher priority. Threads and their corresponding applications when executed by processors 310 may invoke common software routines. Examples of common software routines include software instructions to transmit and receive data from input/output ports, software instructions to read and write to NVM 312 etc.

Event code generation unit 318 may receive asynchronous events from hardware platform 302, firmware 304, operating system 306 and applications 308. Event code generation unit 318 may also receive and/or generate periodic events, such as wrap around events. In one embodiment, the event code generation unit 318 may be the same as or an alternative embodiment of the event code generation unit 112 shown in FIG. 2A. As previously described, in response to receiving asynchronous events and periodic (wrap around) events, event code generation unit 318 may generate corresponding event codes. As will be discussed in greater detail later, a generated event code may optionally include an identifier of the corresponding event, an indication corresponding to a time when the event was generated, status information of hardware platform 302, firmware 304, operating system 306 and applications 308, etc. In an embodiment, event code generation unit 318 may store generated event codes in buffer 314-1 that may be created in RAM 314. In another embodiment, event code generation unit 318 may store generated event codes in mass storage memory 316.

An event code generated by event code generation unit 318 may include not only an indication of the event that caused the generation of the event code but also a time when the event was generated. In this embodiment, the time when an asynchronous event was generated may be represented as the difference between the time when the asynchronous event was received and the time when a last periodic event was generated or received. This difference in time may be referred to as the time offset or a time stamp fraction.

In some embodiments, event code generation unit 318 may cause the generated event codes to be transmitted to remote event tracing unit 326 via test port 321. There may be an event log for storing event identification and an event parser that parses the events and assigns a time stamp to every event. In other embodiments, event code generation unit 318 may cause the generated event codes to be transmitted to remote event tracing unit 326 via communication module 320.

Figure 4:
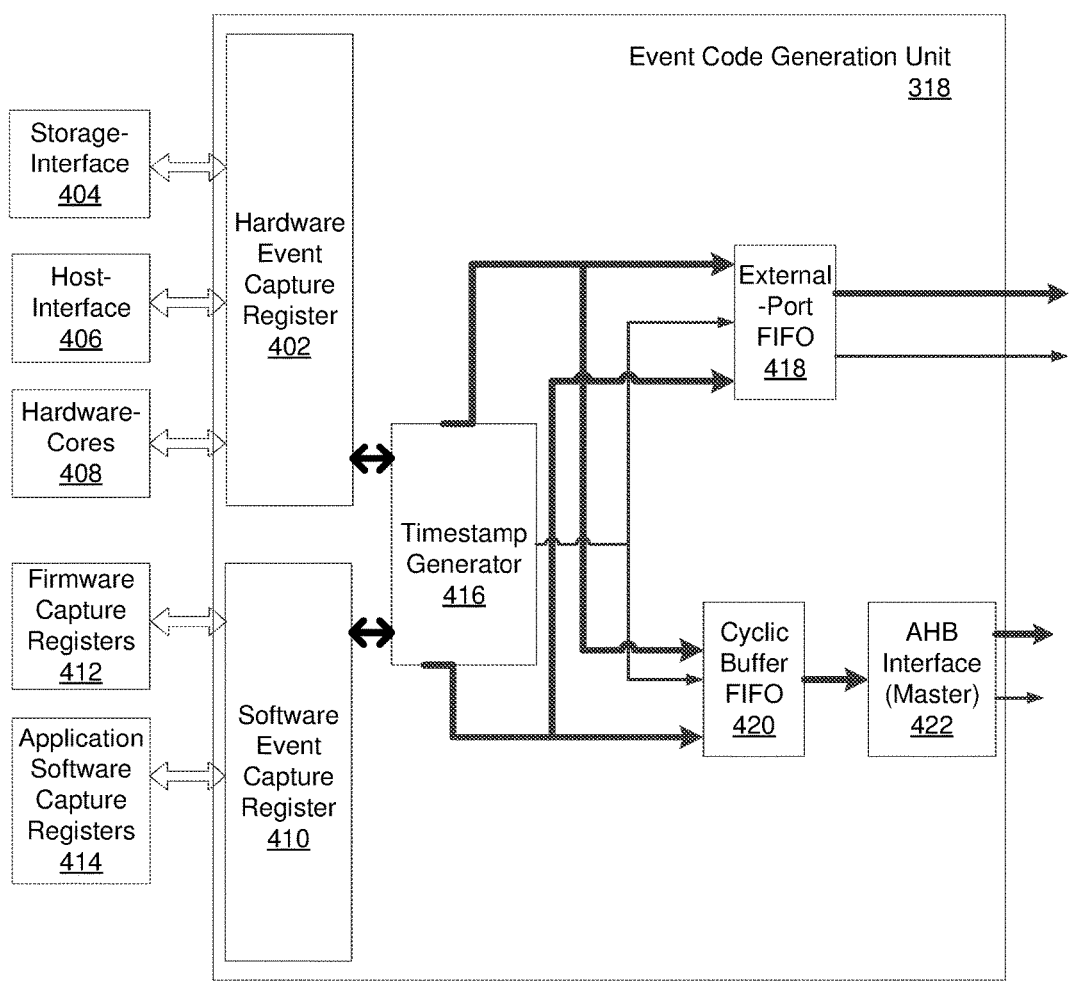
FIG. 4 is a block diagram of an exemplary event code generation unit for the device from FIG. 3.

FIG. 4 is a block diagram of an example event code generation unit 318 that may generate event codes in response to receiving asynchronous and periodic events. Hardware event capture register 402 may receive events from several hardware sources including storage interface 404, host-interface 406 and hardware cores 408. Storage interface 404 may correspond to the hardware interface between mass storage memory 316 and processor 310 of FIG. 3. Host interface 406 may correspond to hardware used to interface a processor with device hardware components such as the interface between processor 310 and RAM 314, for example. Hardware core 408 may store events generated during the operation of CPU cores 310-1 and 310-2 of processor 310, for example.

Software event capture register 410 may be configured to receive asynchronous events from firmware sources including firmware capture registers 412 and application software capture registers 414. Firmware capture registers 412 may receive events generated by firmware 104 of FIG. 1 for example. Application software capture registers 414 may receive events generated by applications 308-1 . . . 308-N, operating system 306 etc. Time stamp generator 416 may receive events from hardware event capture register 402 and software event capture register 410. In response to receiving events, time stamp generator 416 may generate time stamp offsets and corresponding event codes. As previously discussed the generated event codes may including identifiers corresponding to the events received at hardware event capture register 402 and software event capture register 410 and associated time stamp offsets. Separately, time stamp generator 416 may also generate periodic events code based on internally generated periodic events. The periodic event codes may include an identifier that event tracing unit 326 of FIG. 3 may recognize as a periodic event.

The generated event codes may be transmitted via external first in first out (FIFO) port 418. Separately, the generated event codes may be stored in cyclic buffer FIFO 420. A high speed bus master like advanced high-performance bus (AHB) master 422 may transmit the generated event codes. An event tracing unit 326 may receive the event codes via either a bus connected to external FIFO port 418 or via a bus configured to operate in accordance with the protocol used by AHB master 422. While the event code generating unit 318 may be a hardware module such as an application specific integrated circuit (ASIC) or other integrated circuit as described above, in other embodiments it is contemplated that it may be implemented in firmware with a dedicated or shared processor.

Figure 5:
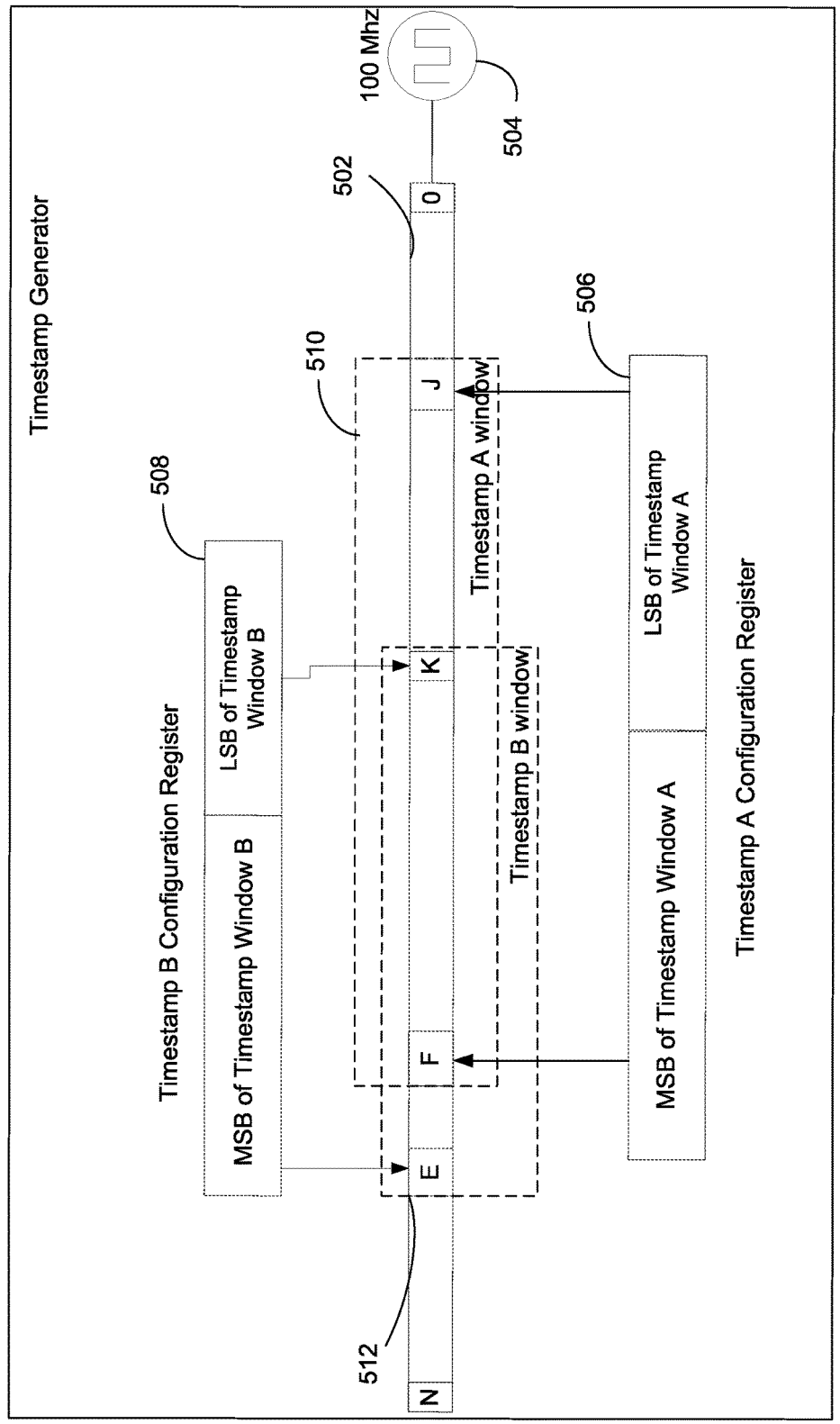
FIG. 5 is a block diagram of an exemplary time stamp generator.

FIG. 5 is a block diagram of an example time stamp generator 416 that may be implemented in event code generation unit 318 to generate, in response to receiving asynchronous events, event codes that include time stamps offsets or fractions. In this example, time stamp A configuration register 506 and time stamp B configuration register 508 in conjunction with hardware timer/counter 502 may generate periodic events at two different rates and time stamp fractions or offsets having different resolutions. Time stamp configuration registers 506 and 508 may be used to specify the precision to be used when calculating time stamp offsets for events received from sources having different minimum inter-event spacing. Separately, time stamp configuration registers 506 and 508 may be used to specify the frequency or the rate at which periodic events are to be generated. Time stamp configuration registers 506 and 508 may be configured when device 300 is powered-on. In other embodiments, a user may communicate with device 300 via communication module 320 to dynamically configure time stamp configuration registers 506 and 508. In still other embodiments, event tracing unit 326 may time stamp configuration registers 506 and 508.

Hardware timer/counter 502 may receive a clock signal 504 which causes it to count up with each clock pulse. In the example of FIG. 5, clock 504 is configured to generate a continuous series of pulses at a fixed rate. In this example clock 504 generates $1 \times 10^6$ or 1 million pulses per second. Stated differently, clock 504 generates a pulse very 1 microsecond (μsec). A person having ordinary skill in the art of hardware design will recognize this as a clock signal with a frequency of 1 Megahertz (1 MHz) or $10^6$ Hz. Hardware timer/counter 502 has N-bits, where N is an integer and corresponds to the width or the number of bits that make up the counter. The value of counter 502 is incremented by one (1) for each pulse received from clock 502. When the value in counter 502 is incremented to the maximum value i.e. $2^N$, counter 502 is reset to 0 and the process is repeated (rollover). As an example if N is 32 bits, for each clock pulse generated by clock 504, counter 502 increments by 1 until counter 502 reaches a count corresponding to $2^{32}$ or 4294967296. Because in this example, a clock pulse is generated every 1 µsec, hardware timer/counter 502 rolls over after receiving 4294967295 clock pulses or every 4294967296*1 µsec.

Each time stamp configuration register 506 and 508 defines a respective time stamp fraction window 510 and 512. The most significant bit (MSB) of a time stamp configuration register controls the periodicity of the periodic event generated and the least significant bit (LSB) of the time stamp configuration register determines the resolution of the time stamp offset or fraction. The MSB corresponds to a respective bit position in hardware timer/counter 502. A periodic event is generated each time a bit in hardware timer 502 corresponding to the MSB of either of time stamp configuration registers A 506 or B 508 transitions from '0' to '1' or '1' to '0.' Thus, periodic events will be generated at a fixed rate determined by the relative position of the MSB. In this example, because MSB of time stamp configuration register B 508 is of a higher order than MSB of configuration register A, periodic events based on configuration register B will be generated more infrequently than periodic events based on configuration register A. Stated differently, the time duration between two consecutive periodic events generated based on time stamp configuration register B 508 will be greater than the time duration between two consecutive periodic events generated based on time stamp configuration register A 506.

As an example, if MSB of time stamp configuration registers A 506 corresponds to bit 12 (F) of hardware counter/timer 502 is set, a periodic event is generated every $2^{11}$ or 2048 clock pulses received by hardware timer/counter 502. Thus, in the case of a 1 MHz clock signal where a pulse is generated every 1 µsec by clock 504, a periodic event may be generated every 2048 µsec. In contrast, MSB of time stamp configuration registers B 508 corresponding to bit 20 (E) of hardware counter/timer 502 is set, a periodic event is generated every $2^{19}$ or 524288 clock pulses received by hardware timer/counter 502 or every 524288 µsec (approximately every 524 msec). Thus, by configuring the appropriate MSB, periodic events may be generated at a configurable rate.

In response to receiving a periodic event time stamp generator 416 may generate a periodic event code that includes an identifier that indicates that the event code corresponds to a periodic event. In some embodiments, time stamp generator 416 may include information in the periodic event code. Information may comprise run-time status of the device 300 including the program counter of processor 310, status of CPU cores 310-1 and 310-2, stack pointer, free memory space etc.

In some embodiments, asynchronous events generated from one source may be generated at a first maximum rate and asynchronous events generated by another may be generated at a slower second maximum rate. Generally, the maximum rate corresponds to the minimal inter-event spacing for events received from a particular source. In the discussion that follows, asynchronous events received from one or more sources having a common maximum rate may be referred to a set of events. For example, with reference to FIG. 4, events received from hardware event capture register 402 may be received a first maximum rate and may constitute one set of asynchronous events and events received from software event capture register 410 may be received at slower second maximum rate and may constitute one set of asynchronous events. As another example, events may be generated by hardware platform 302 (FIG. 3) at a rate faster than the rate at which events are generated by firmware 304, operating system 306 and applications 308 (software events). In other words, the minimum inter-event spacing for software events is greater than the minimum inter-event spacing for events generated by hardware platform 302. Consequently, time stamp generator 416 may generate lower precision time stamp fractions or offsets when software events are received. Lower precision time stamp fractions may be generated by disregarding lower order bits of hardware timer/counter 502. The LSB of time stamp configuration registers 506 and 508 may be used to specify/configure the precision of the time stamp offsets. The LSB and MSB of time stamp configuration register A 506 and time stamp configuration register B 508 define respective time stamp fraction window frames 510 and 512 which may be used as bit masks to generate time stamp fractions based on hardware timer/counter 502.

In response to receiving events from hardware event capture register 402, time stamp generator 416 may generate a time stamp offset or fraction based on time stamp configuration register A 506 and corresponding time stamp fraction window frames 510 and in response to receiving events from software event capture register 410, time stamp generator 416 may generate a time stamp offset or fraction based on time stamp B configuration register 508 and corresponding time stamp fraction window frames 512. To generate a time stamp fraction in response to receiving an event from hardware event capture register 402, for example, time stamp generator 416 may record the setting of the bits in the hardware timer/counter 502 corresponding to the bits between the MSB and LSB including the LSB of time stamp configuration register A 506. Similarly, to generate a time stamp fraction in response to receiving an event from software event capture register 402, for example, time stamp generator 416 may record the setting of the bits in the hardware timer/counter 502 corresponding to the bits between and including the MSB and LSB of time stamp configuration register B 508. In this embodiment, the generated time stamp fraction corresponds to the time elapsed since the last generated periodic event Time stamp generator 416 may generate an asynchronous event code by concatenating an identifier corresponding to a generated asynchronous event and the determined time stamp fraction. The generated event codes and periodic event codes may be transmitted to the event tracing unit 326 via test port 321, in an embodiment. In another embodiment, the generated event code may be stored in cyclic buffer, 314-1 of FIG. 3 for example. In this embodiment, the event codes may be transmitted to event tracing unit 326 by a bus controller via a high speed bus (not shown). Event tracing unit 326 may reconstruct a different timescale for each of the sources of asynchronous on a single unified scale, which can be then combined with the timescales of other asynchronous sources that derive from the same time stamp despite the fact that the precisions of these timescales may be absolutely different. As previously explained, the precision selected corresponds to the maximum rate at which the source may generate events. More specifically, this provides for performing better analysis/profiling of the system flow by focusing on a specific timescale view of events coming in from a specific source; or by focusing on a combination of timescale views of events coming in from several different sources; or on all the events of all multiple sources on the same timescale view.

Figure 6:
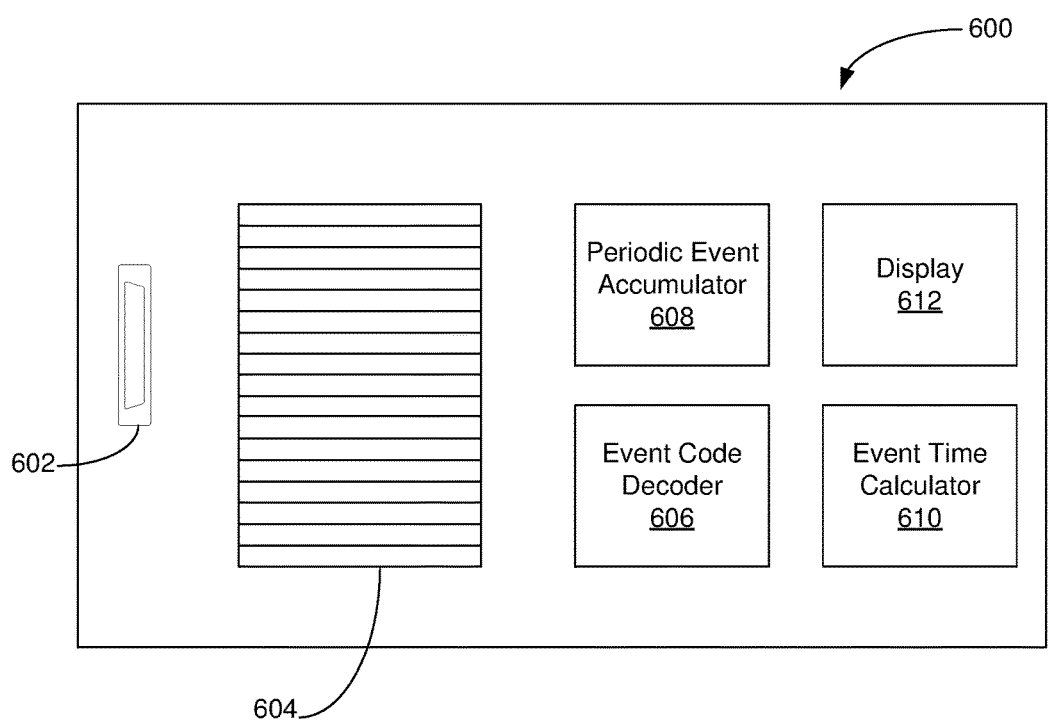
FIG. 6 is a diagram of an exemplary event tracing unit.

FIG. 6 is a block diagram of an example event tracing unit 600. Event tracing unit 600 may correspond to the event tracing unit 326 of FIG. 3. Event tracing unit 600 may be coupled to device 300 of FIG. 3 via communication controller 602. In this example, communication interface 602 may include special purpose circuitry, such as an ASIC, and firmware that implements communications protocols that may be used by device 300 to communicate event codes. As an example, if the communication controller 602 corresponds to a USB port, communication controller 602 may include the appropriate circuitry and firmware to decode the USB protocol and recover the event codes transmitted by device 300. Communication controller 602 may store the recovered event codes in buffer 604. Buffer 604 may correspond to a circular or ring buffer. Accordingly, communication controller 602 may store event codes in consecutive memory locations and when communication controller 602 encounters the last memory location of buffer 604, communication controller 602 may "loop back" and store the next event code in the first location of buffer 604.

Event code decoder 606 is adapted to receive an indication from communication controller 602 when communication controller 602 stores an event code in buffer 604, in an embodiment. In this embodiment, communication controller 602 may generate an interrupt when an event code is stored in buffer 604. Communication controller 604 may also provide event code decoder 606 with a reference to a memory location in buffer 604 where the event code is stored. Event code decoder 606 may retrieve the event code from buffer 604. Based on information/data contained in the event retrieved event code, event code decoder 606 may determine if the event code corresponds to a periodic event or an asynchronous event.

The event code decoder 606 may examine the MSB of the event code to determine if the event code corresponds to a periodic event or an asynchronous event. For example, if the MSB is set, event code decoder 606 may conclude that the event code corresponds to a periodic event. In response to determining that the event code corresponds to a periodic event, event code decoder 606 may instruct periodic event accumulator 608 to increment a count corresponding to the number of periodic events received by the event tracing unit 600. Event code decoder 606 may instruct event time calculator 610 to calculate the time at which a periodic event was generated.

In response to detecting that a received event code corresponds to an asynchronous event, event code decoder 606 may identify the asynchronous event and/or its source based on information in the event code. Separately, event code decoder 606 may retrieve a time stamp fraction from the event code. Event code decoder 606 may instruct event time calculator 610 to generate a time stamp when the asynchronous event was generated in the device 300, for example.

To generate the time, event time calculator 610 may retrieve the count of the previously received periodic events stored in periodic event accumulator 608 and multiply the count by the periodic event rate. Additionally, event time calculator 610 may add the time stamp offset to the product of the count of the previously received periodic events and periodic event rate to generate a time stamp for the asynchronous event. Event tracing unit 600 may display periodic events and their corresponding time stamps at display 612. In an embodiment, event tracing unit 600 may also display the corresponding status information extracted from a periodic event code. Event tracing unit 600 may also display an identifier corresponding to a received asynchronous event code, its source and/or its corresponding time stamp at display 612.

By using a dynamic approach with both relative time stamps (for wrap around or synchronous events) and absolute time stamps (for normal events), the bandwidth required for sending the time stamp information can be reduced. It may also reduce the size of a log when no events are present. It also allows for tailoring the use of time stamps according to the mode of operation of the events in the system. For example, attaching time stamps (e.g. high precision time stamps) may only occur to correspond with actual events occurring in the system. This dynamic decision making can be applied for each of the wrap around events and applied between consecutive wrap around events, so that high precision time stamps using a special event code are sent only when required. This allows for reducing the size of the logs in any system having multiple events that are submitted at varying rates. The reduction may be for internal logs stored in on-chip RAM and for external logs that are output via a trace interface. In addition, the required bandwidth for sending time stamp information may also be reduced.

The embodiments described herein may be implemented by a state machine in the embedded device that detects the occurrence of a normal event in the system after transmission of a wraparound event. Specifically, the state machine may be used in such a way so that once a non-wrap around event is detected in the system, a flag may be triggered to indicate this. When the system timer register indicates that the next wrap around event occurs, the system determines whether any normal event was submitted in the system in the previous wraparound event time interval. If no events were submitted, then the system suppresses sending additional wrap around events. Suppression of additional wrap around events occurs until the next non-wrap around event is detected in the system. When this happens, such non-wrap around events are sent with a high precision time stamp. This process is further described with respect to FIGS. 7-8.

The relative time stamps are in the form of wrap around events that are sent after a regular event is submitted in the system. Since the normal events in the system are typically transmitted at a non-constant rate, the time stamp information attached to or encoded with the submitted event code may not be able to provide sufficient information for profiling or tracking purposes. Wrap around events are produced at a constant rate to emulate normal events. Such events may be also referred to as service events. Accordingly, such wrap around events are transmitted at a configurable rate according to system requirements, in a way that provides profiling of system events (normal events) that are submitted in the system.

Figure 7:
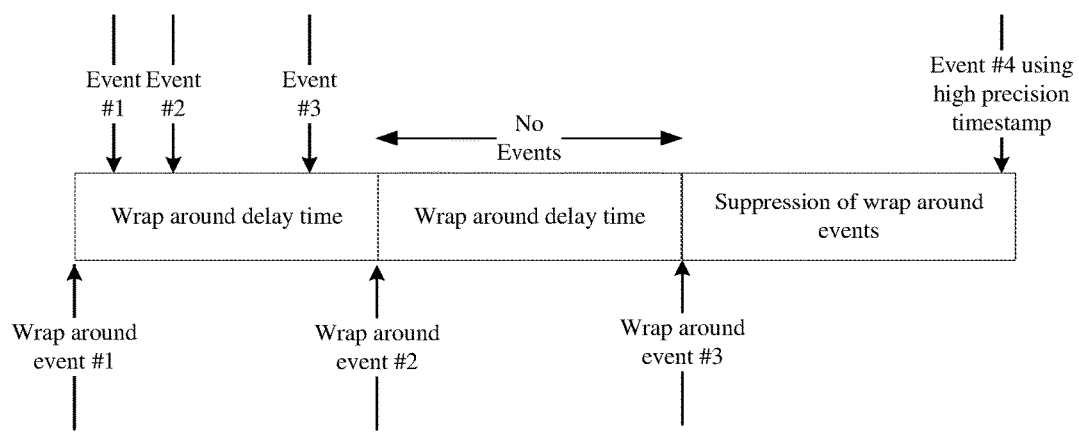
FIG. 7 is a diagram of dynamic event handling using different types of events.

FIG. 7 is a diagram of dynamic event handling using different types of events. FIG. 7 shows wrap around events are submitted at a configurable rate (wrap around delay time). After wrap around event #1, there three normal events (event #1, event #2, and event #3) before wrap around event #2. However, in the next interval (between wrap around event #2 and wrap around event #3) there are no events. When there are no events in a wrap around cycle, the relative time stamps can be suppressed and an absolute (high precision) time stamp is used for the next event. In other words, after wrap around event #3, wrap around events are suppressed. Specifically, the next event, event #4, uses a high precision time stamp because wrap around events are suppressed.

The suppression of wrap around events can be triggered in different ways rather than just a single period without an event. For example, the suppression may begin if there more than one periods without an event. In an alternative embodiment, after any whole number of periods without an event, the wrap around events are suppressed. It may also be possible to monitor a shorter time frame than the period between two wrap around events. For example, if there are no events in a portion of the period between wrap around events, the wrap around events may be suppressed.

The wrap around events (e.g. event #1, event #2, and event #3) are transmitted in the system between two wrap around events, such that the time stamp of each transmitted normal event indicates the time that has elapsed between a current event and the preceding wrap around-event. Since these wrap around events are transmitted at a constant rate, they do not have to be transmitted or encoded with a time stamp. Accordingly, the time stamp of each wrap around event may be obtained based on the time stamp of the last transmitted event.

The suppression may include avoiding sending out wrap events when there are no other events. The events may need to be determined to be a significant event for requiring a time stamp. Exemplary significant events may include a timer expiration, error events, interrupt to the processor/controller, wake event, sleep event, power mode change, or any commands received, such as from the host. Filters may identify significant events and those may be the events that are required to be time stamped. In other embodiments, to end the suppression of wrap around events may require the receipt of a significant event.

The embodiments described produce a trace of events that includes normal events interleaved with the wrap around-events. In an implementation, a timer facility may be used for transmitting these wrap around events at a configurable rate (i.e. wrap around delay time). The timer facility, such as in a form of hardware timer in the embedded device, is configured with abilities of firing interrupts at a configurable rate.

FIG. 8 is a flow diagram of dynamically tracking events by suppressing wrap around events. In block 802, there is a detection of the submission of an asynchronous system event that is submitted in the system with an event code that contains only part of the timer bits. In block 804, a time counter is initiated for wrap around after a pre-defined time (bits). The pre-defined time can be adjustable. In one embodiment, it may be ten milliseconds, but the time frame can be modified. A longer time results in a greater likelihood of more wrap around events (reducing suppression), while a shorter time increases the likelihood that wrap around events will be suppressed. In block 806, there is a determination as to whether there are one or more events received before the next wrap around time. If no events are detected in the system in the time frame between consecutive wrap around events, then the system suppresses the sending warp around events and counts the wrap around event number in block 810. The time stamp is a high precision time stamp in block 812. While an event is received between wrap around times, the wrap around events are not suppressed and will continue in block 808. In one embodiment, the high precision time stamp register is 48 bits while the event code is of 32 bits.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

It is intended that the foregoing detailed description be understood as an illustration of selected forms that the invention can take and not as a definition of the invention. It is only the following claims, including all equivalents that are intended to define the scope of the claimed invention. Finally, it should be noted that any aspect of any of the preferred embodiments described herein can be used alone or in combination with one another.

We claim:

1. An apparatus comprising:
  a processor configured to:
    generate a relative time stamp responsive to there being an asynchronous event between successive wrap around events; and
    responsive to there being no asynchronous events between successive wrap around events:
    suppress subsequent wrap around events; and
    generate a high precision time stamp before a next asynchronous event.

2. The apparatus of claim 1, wherein the suppression of the subsequent wrap around events comprises stopping the wrap around events from being generated until the next asynchronous event.

3. The apparatus of claim 1, further comprising an event tracing unit configured to receive event tracking details including time stamps.

4. The apparatus of claim 3, wherein the event tracing unit provides for debugging or testing based on the relative time stamp and based on the high precision time stamp.

5. The apparatus of claim 1, wherein the wrap around events comprise synchronous events issued periodically.

6. The apparatus of claim 5, wherein the successive wrap around events are consecutive synchronous events.

7. The apparatus of claim 1, wherein the processor is further configured to:
cease the suppression of the subsequent wrap around events after the next asynchronous event.

8. The apparatus of claim 1, wherein the processor is further configured to:
prior to the generation of a relative time stamp, initiate wrap around events that are issued periodically.

9. The apparatus of claim 8, wherein the suppression of the subsequent wrap around events comprises ceasing the initiation of the wrap around events.

10. The apparatus of claim 9, wherein the initiation of the wrap around events is restarted after the high precision time stamp is generated for the next asynchronous event.

11. The apparatus of claim 1, wherein:
the next asynchronous event comprises a significant event; and
the significant event comprises a timer expiration, an error event, an interrupt to a processor, a wake event, a sleep event, a power mode change, or a command received.

12. A system comprising:
means for initiating a timer for synchronous wrap around events to be issued periodically;
means for determining whether an asynchronous event is received during periods between consecutive synchronous wrap around events;
means for providing, responsive to the asynchronous event being received between the consecutive synchronous wrap around events, time stamps based on the synchronous wrap around events; and
means for suppressing, responsive to no asynchronous event being received between the consecutive synchronous wrap around events, subsequent synchronous wrap around events;
wherein at least one of the means for initiating, means for determining, means for providing, and means for suppressing comprises a processor.

13. The system of claim 12, further comprising:
means for adding, after an asynchronous event is received during the suppressing, a high precision time stamp to the asynchronous event rather than a time stamp based on the synchronous wrap around events.

14. The system of claim 12, wherein suppressing subsequent synchronous wrap around events comprises stopping the timer.

15. The system of claim 14, further comprising:
means for re-initiating, after a receipt of an asynchronous event during the suppressing, the timer.

16. A system on a chip (SOC) comprising:
a non-volatile memory;
a controller that accesses the non-volatile memory; and
an event code generation unit configured to:
issue periodic synchronous events used for determining relative time stamps for asynchronous events; and
issue explicit time stamps for asynchronous events responsive to there being no asynchronous events during a period between the synchronous events.

17. The SOC of claim 16, wherein an event comprises a command received from a host device issued to the SOC.

18. The SOC of claim 16, wherein the event code generation unit is part of the controller.

19. The SOC of claim 16, wherein the event code generation unit is further configured to suppress the periodic synchronous events responsive to there being no asynchronous events during a period between the synchronous events.

20. The SOC of claim 19, wherein the event code generation unit is further configured to stop suppressing the periodic synchronous events after the issuing of the explicit time stamp for an asynchronous event occurring during the suppression.

* * * * *